United States Patent
Wang et al.

(10) Patent No.: US 12,260,030 B1
(45) Date of Patent: Mar. 25, 2025

(54) STYLUS AND TOUCH DEVICE FOR ENCODING AND TRANSMITTING SIGNAL HAVING MULTIPLE FREQUENCIES

(71) Applicant: Novatek Microelectronics Corp., Hsinchu (TW)

(72) Inventors: Tsung-Yu Wang, Hsinchu County (TW); Yun-Hsiang Yeh, Hsinchu (TW); Yuan-Fu Hsueh, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/396,751

(22) Filed: Dec. 27, 2023

(51) Int. Cl.
*G06F 3/03* (2006.01)
*G06F 3/0354* (2013.01)
*G06F 3/044* (2006.01)

(52) U.S. Cl.
CPC ........ *G06F 3/03545* (2013.01); *G06F 3/0442* (2019.05)

(58) Field of Classification Search
CPC ............................ G06F 3/03545; G06F 3/0442
See application file for complete search history.

(56) References Cited

U.S. PATENT DOCUMENTS

| | | | |
|---|---|---|---|
| 10,331,235 B2 | 6/2019 | Fleck | |
| 11,500,481 B1 * | 11/2022 | Hung | G06F 3/0383 |
| 12,019,829 B2 | 6/2024 | Kim et al. | |
| 2011/0155479 A1 * | 6/2011 | Oda | G06F 3/044 |
| | | | 178/19.04 |
| 2018/0143703 A1 | 5/2018 | Fleck | |
| 2019/0171304 A1 * | 6/2019 | Hara | G06F 3/03545 |
| 2020/0042113 A1 * | 2/2020 | Chen | G06F 3/0383 |
| 2021/0103374 A1 * | 4/2021 | Liang | G06F 3/03545 |
| 2021/0357040 A1 * | 11/2021 | Gray | G06F 3/0416 |
| 2022/0057870 A1 * | 2/2022 | Miyamoto | G06F 3/0442 |
| 2023/0133003 A1 * | 5/2023 | Noguchi | G06F 3/0441 |
| | | | 345/179 |
| 2023/0409146 A1 | 12/2023 | Kim et al. | |

FOREIGN PATENT DOCUMENTS

| | | |
|---|---|---|
| CN | 117270710 | 12/2023 |
| TW | M617533 | 9/2021 |
| TW | I742111 | 10/2021 |

OTHER PUBLICATIONS

"Office Action of Taiwan Counterpart Application", issued on Sep. 11, 2024, p. 1-p. 7.
"Office Action of Taiwan Counterpart Application", issued on Nov. 12, 2024, p. 1-p. 8.

* cited by examiner

*Primary Examiner* — Liliana Cerullo
(74) *Attorney, Agent, or Firm* — JCIPRNET

(57) ABSTRACT

A stylus and a touch device are provided. The stylus includes a tip portion and a transmission electrode. The transmission electrode is disposed on the tip portion. The transmission electrode transmits a downlink signal to the touch device. The touch device includes a touch panel and a touch processing circuit. The touch processing circuit is coupled to the touch panel. The touch processing circuit receives the downlink signal from the stylus through the touch panel. The downlink signal includes a plurality of different frequencies.

12 Claims, 5 Drawing Sheets

STYLUS AND TOUCH DEVICE FOR ENCODING AND TRANSMITTING SIGNAL HAVING MULTIPLE FREQUENCIES

BACKGROUND

Technical Field

The disclosure relates to an electronic equipment, and in particular to a stylus and a touch device.

Description of Related Art

More and more electronic equipment (for example, touch devices such as laptops, tablet computers, and mobile phones) are equipped with active stylus to provide users with more human-computer interaction manners. Currently, the active stylus functions as a single-direction, and single-energy transmitter, and can only output the user's operating position in the application, but does not have the ability to transmit data.

SUMMARY

The disclosure provides a stylus and a touch device. The stylus is configured to encode data to be transmitted in different frequencies and can effectively transmit the encoded data to the touch device.

In an embodiment of the disclosure, a stylus includes a tip portion and a transmission electrode. The transmission electrode is disposed on the tip portion. The transmission electrode transmits at least one downlink signal to a touch device. The at least one downlink signal includes a plurality of different frequencies.

In an embodiment of the disclosure, a touch device includes a touch panel and a touch processing circuit. The touch processing circuit is coupled to the touch panel. The touch processing circuit receives at least one downlink signal from a stylus through the touch panel. The at least one downlink signal includes a plurality of different frequencies.

In order for the features and advantages of the disclosure to be more comprehensible, the following specific embodiments are described in detail in conjunction with the drawings.

DETAILED DESCRIPTION OF DISCLOSED EMBODIMENTS

Figure 1:
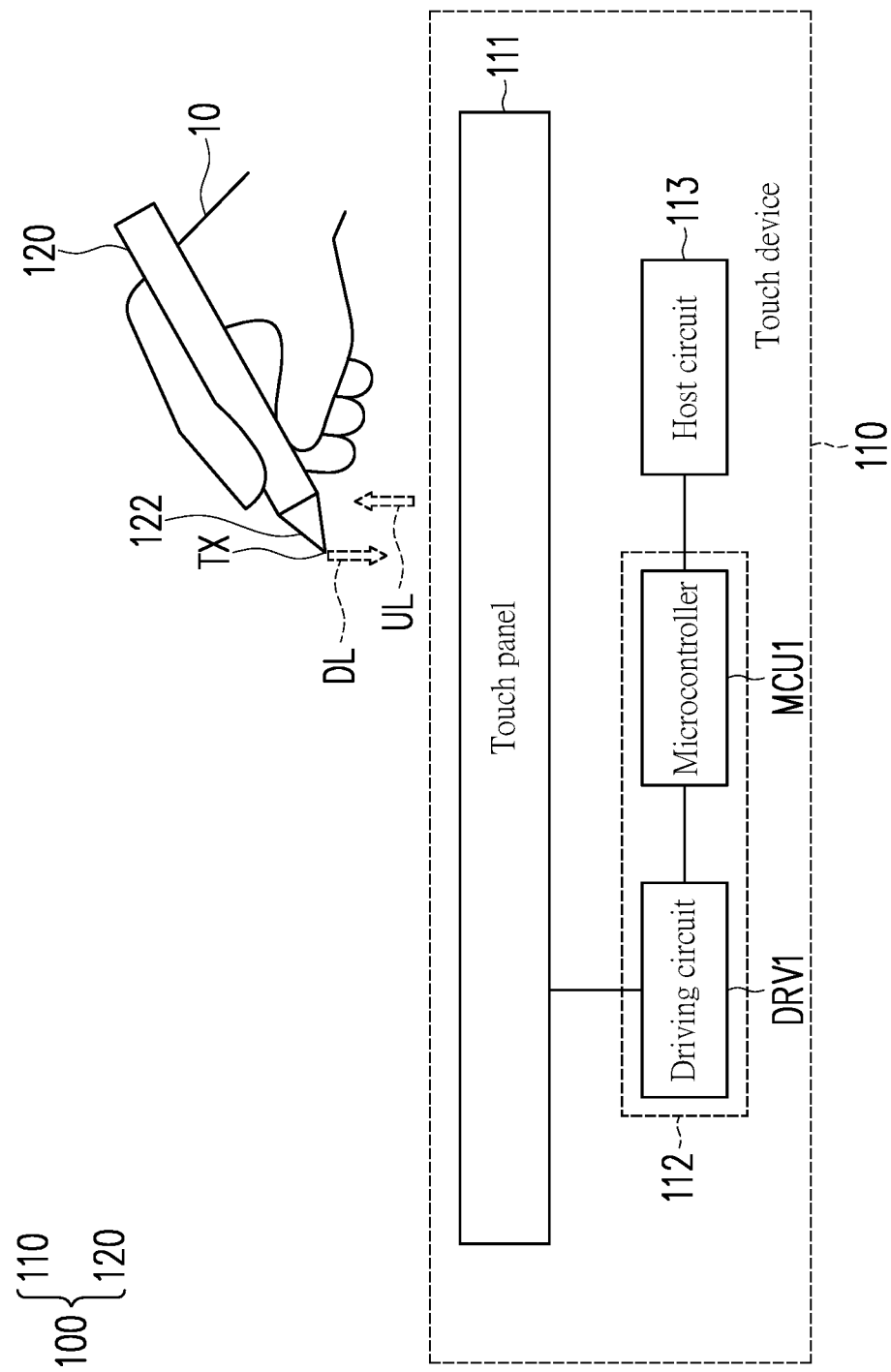
FIG. 1 is a schematic view of an operation scenario of a touch system according to an embodiment of the disclosure.

The term "coupling (or connection)" used in the entire specification (including the claims) of the disclosure may refer to any direct or indirect connection means. For example, if a first device is described as being coupled (or connected) to a second device, it should be interpreted that the first device may be directly connected to the second device or the first device may be indirectly connected to the second device through another device or certain connection means. Terms such as "first" and "second" mentioned in the entire specification (including the claims) of the disclosure are used to name the elements or to distinguish between different embodiments or ranges, but not to limit the upper limit or the lower limit of the number of elements or to limit the sequence of the elements. In addition, wherever possible, elements/components/steps using the same reference numerals in the drawings and the implementation manners represent the same or similar parts. Related descriptions of the elements/components/steps using the same reference numerals or using the same terminologies in different embodiments may be cross-referenced.

FIG. 1 is a schematic view of an operation scenario of a touch system 100 according to an embodiment of the disclosure. Referring to FIG. 1, the touch system 100 includes a touch device 110 and a stylus 120. Based on the actual design, the touch device 110 may be implemented as a tablet computer, a smart phone, a monitor, a notebook computer, or other electronic equipment.

The stylus 120 includes a tip portion 122 and a transmission electrode TX. The transmission electrode TX is disposed on the tip portion 122. The tip portion of the stylus 120 is provided with the transmission electrode TX. The touch panel 111 of the touch device 110 may detect a touch event. When the stylus 120 is located above the touch panel 111, the touch device 110 may transmit an uplink signal UL to the stylus 120 through the touch panel 111, and receive a downlink signal DL sent by the transmission electrode TX of the tip portion of the stylus 120, so as to perform an active stylus touch detection operation. A hand 10 of the user may hold a holding portion (for example, the body) of the stylus 120 to use/operate the stylus 120 on the touch panel 111. A user may operate the stylus 120 to write on the touch panel 111 of the touch device 110.

The touch device 110 includes the touch panel 111, a touch processing circuit 112, and a host circuit 113. The touch processing circuit 112 is coupled to the touch panel 111, and receives the downlink signal DL from the stylus 120 through the touch panel 111. According to the actual design, the host circuit 113 may include a central processing unit (CPU) and/or other circuits. The touch processing circuit 112 may be a touch display driver integration (TDDI) circuit or other touch control circuits. Based on the control of the host circuit 113, the touch processing circuit 112 may drive/control the touch panel 111, so that the touch panel 111 detects the touch event.

According to different designs, in some embodiments, the touch processing circuit 112 and (or) the host circuit 113 may be implemented as hardware circuits. In some other embodiments, the touch processing circuit 112 and (or) the host circuit 113 may be implemented in the form of firmware, software (that is, program), or a combination of the two. In yet other embodiments, the touch processing circuit 112 and (or) the host circuit 113 may be implemented in the form of a combination of multiple of hardware, firmware, and software.

In terms of the form of hardware, the touch processing circuit 112 and (or) the host circuit 113 may be implemented as logic circuits on an integrated circuit. For example, the relevant functions of the touch processing circuit 112 and (or) the host circuit 113 may be implemented in one or more controllers, microcontrollers, microprocessors, application-specific integrated circuits (ASIC), digital signal processors (DSP), field programmable gate arrays (FPGA), central processing units (CPU), and/or various logic blocks, modules, and circuits in other processing units. The relevant functions of the touch processing circuit 112 and (or) the host circuit 113 may be implemented as hardware circuits such as various logic blocks, modules, and circuits in integrated circuits by using hardware description languages (for example, Verilog HDL or VHDL) or other suitable programming languages.

In terms of the form of software and/or the form of firmware, the relevant functions of the touch processing circuit 112 and (or) the host circuit 113 may be implemented as programming codes. For example, the touch processing circuit 112 and (or) the host circuit 113 are implemented by using general programming languages (for example, C, C++, or assembly language) or other suitable programming languages. The programming codes may be recorded/stored in a "non-transitory machine-readable storage medium". In some embodiments, the non-transitory machine-readable storage medium includes, for example, a semiconductor memory and/or a storage device. The semiconductor memory includes a memory card, a read only memory (ROM), a flash memory, a programmable logic circuit, or other semiconductor memories. The storage device includes a tape, a disk, a hard disk drive (HDD), a solid-state drive (SSD), or other storage devices. An electronic equipment (for example, a CPU, a controller, a microcontroller, or a microprocessor) may read and execute the programming codes from the non-transitory machine-readable storage medium, thereby implementing the relevant functions of the touch processing circuit 112 and (or) the host circuit 113. Alternatively, the programming codes may be provided to the electronic equipment via any transmission medium (for example, a communication network, a broadcast wave, etc.). The communication network is, for example, the Internet, a wired communication network, a wireless communication network, or other communication media.

The implementation manners of the touch processing circuit 112 may be determined according to the actual design. For example, the touch processing circuit 112 shown in FIG. 1 includes a driving circuit DRV1 and a microcontroller MCU1. The driving circuit DRV1 is used to be coupled to the touch panel 111. The driving circuit DRV1 may detect the at least one downlink signal DL through the touch panel 111. The microcontroller MCU1 is coupled to the driving circuit DRV1. The microcontroller MCU1 may determine the touch event.

Figure 2:
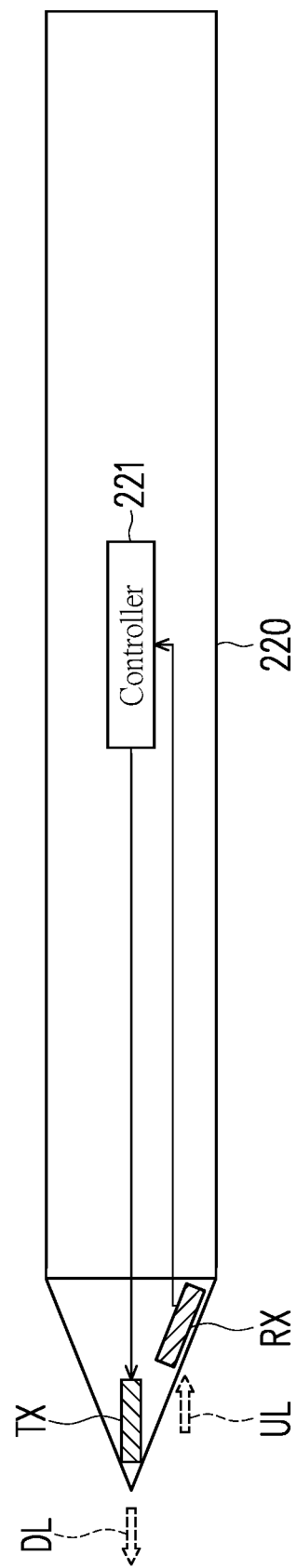
FIG. 2 is a schematic view of a circuit block of a stylus according to an embodiment of the disclosure.

FIG. 2 is a schematic view of a circuit block of a stylus 220 according to an embodiment of the disclosure. Referring to FIG. 1 and FIG. 2, the stylus 220 shown in FIG. 2 may be used as an example of the stylus 120 shown in FIG. 1. The stylus 220 shown in FIG. 2 includes a controller 221, a transmission electrode TX, and a receive electrode RX. The controller 221 shown in FIG. 2 is coupled to the transmission electrode TX and the receive electrode RX. Please refer to FIG. 1 and FIG. 2. When the stylus 220 is located above the touch panel 111, the touch device 110 may transmit the uplink signal UL to the stylus 220 through the touch panel 111. The tip portion of the stylus 220 is provided with the receive electrode RX. The controller 221 may receive the uplink signal UL from the touch panel 111 through the receive electrode RX. The tip portion of the stylus 220 is provided with the transmission electrode TX. In the case where the tip portion is close to the touch panel 111, the controller 221 may transmit the downlink signal DL to the touch panel 111 through the transmission electrode TX. Based on the downlink signal DL of the transmission electrode TX, the touch device 110 may judge a touch position of the tip portion of the stylus 220 on the touch panel 111.

In the disclosure, the transmission electrode the stylus 220 can output data to the touch device 110 by transmitting at least one downlink signal DL to the touch device 110. The at least one downlink signal DL includes a plurality of different frequencies. The controller 221 encodes the data to be transmitted in the manner of frequency modulation and/or mixing frequencies, and transmit the encoded data to the touch device 110.

Figure 3:
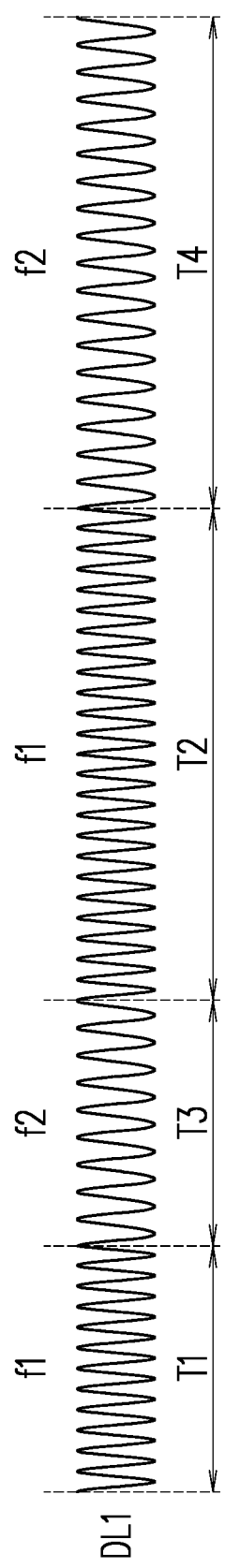
FIG. 3 is a schematic waveform of a downlink signal according to an embodiment of the disclosure.

FIG. 3 is a schematic waveform of a downlink signal according to an embodiment of the disclosure. Referring to FIG. 2 and FIG. 3, the stylus 220 transmits the downlink signal DL1 (the first downlink signal) to the touch device 110. The downlink signal DL1 includes a plurality of different frequencies f1 and f2. The data to be transmitted is encoded by the frequencies f1 and f2.

To be specific, the downlink signal DL1 has the first frequency f1 during a first time period T1 and a second time period T2 and the second frequency f2 during a third time period T3 and a fourth time period T4. The first time period T1, the third time period T3, the second time period T2 and the fourth time period T4 are continuous and alternately arranged.

The length of the first time period T1 is different from the length of the second time period T2. For example, the length of the first time period T1 is shorter than the length of the second time period T2. The length of the third time period T3 is different from the length of the fourth time period T4. For example, the length of the third time period T3 is shorter than the length of the fourth time period T4. Therefore, the data can be encoded by different frequencies f1 and f2 and different time periods T1 to T4.

Figure 4:
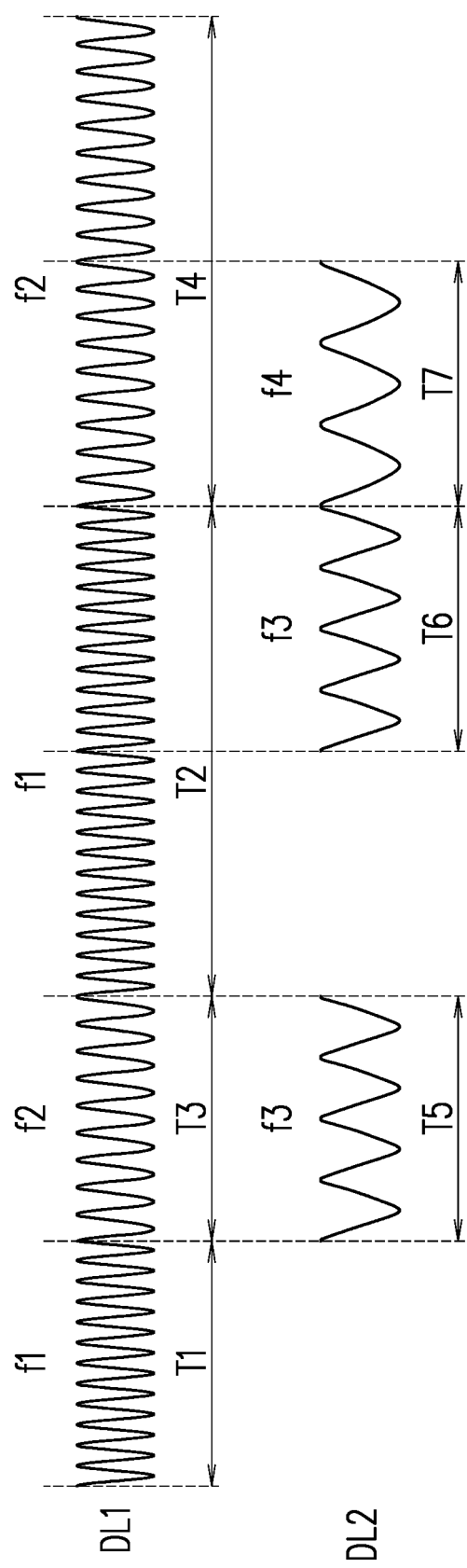
FIG. 4 is a schematic waveform of downlink signals according to another embodiment of the disclosure.

FIG. 4 is a schematic waveform of downlink signals according to another embodiment of the disclosure. Referring to FIG. 2 and FIG. 4, in the present embodiment, the stylus 220 further transmits the downlink signal DL2 (the second downlink signal) to the touch device 110. The downlink signal DL2 includes a plurality of different frequencies f3 and f4. The data to be transmitted is further encoded by the frequencies f3 and f4.

To be specific, the downlink signal DL1 of the present embodiment the same as the downlink signal DL1 of FIG. 3. The downlink signal DL2 has the third frequency f3 during a fifth time period T5 and a sixth time period T6 and the fourth frequency f4 during a seventh time period T7. The fifth time period T5 and the sixth time period T6 are discontinuous, and the fifth time period T5 and the seventh time period T7 are discontinuous. The sixth time period T6 and the seventh time period T7 are continuous. The lengths of the fifth time period T5, the sixth time period T6, and the seventh time period T7 can be the same or different, and the disclosure is not limited thereto. Therefore, the data can be further encoded by different frequencies f3 and f4 and different time periods T5 to T7.

Figure 5:
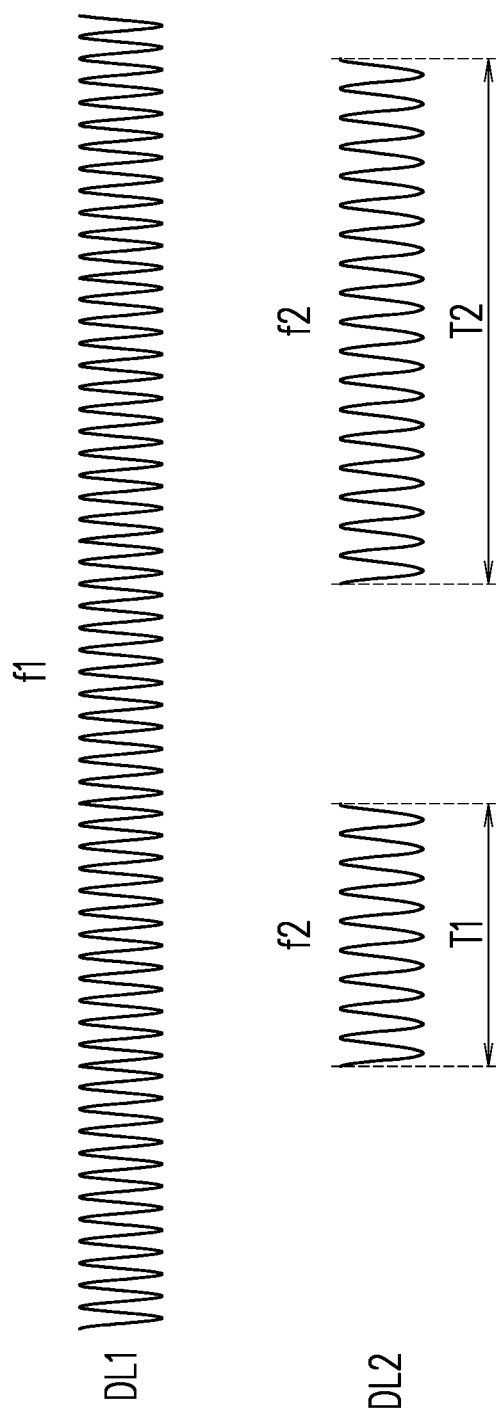
FIG. 5 is a schematic waveform of downlink signals according to another embodiment of the disclosure.

FIG. 5 is a schematic waveform of downlink signals according to another embodiment of the disclosure. Referring to FIG. 2 and FIG. 5, in the present embodiment, the stylus 220 also transmits two downlink signals DL1 and DL2 to the touch device 110. The first downlink signal DL1 has the first frequency f1, and the second downlink signal DL2 has the second frequency f2. The first frequency f1 is different from the second downlink signal DL2. For example, the first frequency f1 is larger than the second downlink signal DL2. The data to be transmitted is encoded by the frequencies f1 and f2.

To be specific, the first downlink signal DL1 is transmitted at the constant frequency f1. The second downlink signal DL2 has the second frequency f2 during a first time period T1 and a second time period T2. The lengths of the first time period T1 and the second time period T2 can be the same or different, and the disclosure is not limited thereto. The first time period T1 and the second time period T2 are discontinuous. Therefore, the data can be encoded by different frequencies f1 and f2 and different time periods T1 and T2.

In summary, in the disclosure, the stylus can encode the data for transmission using frequency modulation and/or mixing frequencies. The encoded data is then transmitted to the touch device. The stylus can provide meaningful information to the touch device, allowing the user to perform various functions such as identifying the stylus version, confirming applicable settings, and activating additional functions. The relevant information may include the stylus's remaining power, pressure sensitivity, and other specifications.

Although the disclosure has been disclosed in the embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A stylus, comprising:
   a tip portion; and
   a transmission electrode, disposed on the tip portion, wherein the transmission electrode transmits at least one downlink signal to a touch device, wherein the at least one downlink signal comprises a plurality of different frequencies,
   wherein the at least one downlink signal comprises a first downlink signal and a second downlink signal, the first downlink signal has a first frequency and a second frequency, the second downlink signal has a third frequency and a fourth frequency, and the first frequency, the second frequency, the third frequency, and the fourth frequency are different and transmitted in time sequence.

2. The stylus according to claim 1, wherein the first downlink signal has the first frequency during a first time period and a second time period, and a length of the first time period is different from a length of the second time period.

3. The stylus according to claim 2, wherein the first downlink signal has the second frequency during a third time period and a fourth time period, and a length of the third time period is different from a length of the fourth time period.

4. The stylus according to claim 1, wherein the second downlink signal has the third frequency during a fifth time period and a sixth time period, and the fifth time period and the sixth time period are discontinuous.

5. The stylus according to claim 4, wherein the second downlink signal has the fourth frequency during a seventh time period, and the fifth time period and the seventh time period are discontinuous.

6. The stylus according to claim 5, wherein the sixth time period and the seventh time period are continuous.

7. A touch device, comprising:
   a touch panel; and
   a touch processing circuit, coupled to the touch panel, and receiving at least one downlink signal from a stylus through the touch panel, wherein the at least one downlink signal comprises a plurality of different frequencies,
   wherein the at least one downlink signal comprises a first downlink signal and a second downlink signal, the first downlink signal has a first frequency and a second frequency, the second downlink signal has a third frequency and a fourth frequency, and the first frequency, the second frequency, the third frequency, and the fourth frequency are different and transmitted in time sequence.

8. The touch device according to claim 7, wherein the first downlink signal has the first frequency during a first time period and a second time period, and a length of the first time period is different from a length of the second time period.

9. The touch device according to claim 8, wherein the first downlink signal has the second frequency during a third time period and a fourth time period, and a length of the third time period is different from a length of the fourth time period.

10. The touch device according to claim 7, wherein the second downlink signal has the third frequency during a fifth time period and a sixth time period, and the fifth time period and the sixth time period are discontinuous.

11. The touch device according to claim 10, wherein the second downlink signal has the fourth frequency during a seventh time period, and the fifth time period and the seventh time period are discontinuous.

12. The touch device according to claim 11, wherein the sixth time period and the seventh time period are continuous.

* * * * *